United States Patent
Rossman et al.

[15] 3,701,537
[45] Oct. 31, 1972

[54] SPLIT TRANSFER SLEEVE

[72] Inventors: Joseph J. Rossman, 926 N. Hill Lane, Cincinnati, Ohio 45224; Wilbur E. Hudgins, 2581 Belhaven Drive, Cincinnati, Ohio 45239

[22] Filed: May 20, 1970

[21] Appl. No.: 39,015

[52] U.S. Cl. ..................279/1 A, 82/44, 279/1 N, 279/2, 279/102
[51] Int. Cl. ..............................B23b 31/10
[58] Field of Search......279/1 N, 1 A, 2, 102, 41, 42, 279/43, 46; 82/44

[56] References Cited

UNITED STATES PATENTS

| | | |
|---|---|---|
| 1,346,890 | 7/1920 | Hottinger ....................82/44 |
| 1,929,285 | 10/1933 | Müller...................279/41 |
| 2,407,908 | 9/1946 | Ventres..................279/41 X |
| 2,082,345 | 6/1937 | Lässer..................279/2 UX |
| 1,810,275 | 6/1931 | Howell .....................279/2 |

*Primary Examiner*—Andrew R. Juhasz
*Assistant Examiner*—James F. Coan
*Attorney*—Kinney and Schenk

[57] ABSTRACT

A split transfer sleeve for use in conjunction with expanding arbors and chucks is disclosed. The transfer sleeve is so constructed that, upon completion of the expansion or contraction of the sleeve to engage a workpiece, the sleeve work engaging surface is a continuous and uninterrupted surface.

1 Claim, 2 Drawing Figures

PATENTED OCT 31 1972 3,701,537

INVENTORS
JOSEPH J. ROSSMAN
BY WILBUR E. HUDGINS

*Kinney & Schenk*
ATTORNEYS

SPLIT TRANSFER SLEEVE

BACKGROUND OF THE INVENTION

This invention pertains to work engaging members and more particularly to a transfer sleeve used with chucks and arbors in which the sleeve performs the work engaging function.

It is common practice to provide an adapter between a chuck or arbor and a workpiece. Previously used adapters have not been entirely satisfactory because of the non-uniform work engaging surface which they presented. The previously used devices were most generally formed with a slot or split connecting the inside diameter of the adapter or sleeve with an aperture running laterally through the adapter and a slot alternately connecting the outside diameter of the adapter to a similar aperture running laterally through the sleeve. On expanding the adapter, the slots connected to the outside diameter open up and thereby cause an interrupted surface. Also, the outside diameter will not be round due to the highs and lows caused by this construction. In other words, the outer surface will have high spots adjacent each slot and a low spot near the center between the slots. The difference between the high and low may only be in the area of thousandths of an inch, but in some work this is very critical and not satisfactory. It is also seen that when the adapter is used to grip the outside diameter of a workpiece, i.e., the adapter is being contracted or expanded inwardly, the slotted construction thereof provides the same interrupted work engaging surface having the high and low spots.

Accordingly, it is an object of this invention to provide a split transfer sleeve which will provide uniform work engaging surface.

Another object of this invention is to provide a split transfer sleeve which is of simple and rugged construction and operates to provide an uninterrupted work engaging surface.

A further object of this invention is to provide a split transfer sleeve having a plurality of segment forming slots extending laterally through the sleeve, each slot terminating a predetermined distance from the work engaging surface and thereby leaving an expandable cross-section of metal adjacent the work engaging surface.

An additional object of this invention is to provide a split transfer sleeve having no slots connected to the work engaging surface.

SUMMARY OF THE INVENTION

This invention provides an improved split transfer sleeve for use with expanding arbors and chucks. The transfer sleeve is of simple and economical construction and provides a continuous uninterrupted work engaging surface. The laterally running slots terminate at a predetermined distance from the work engaging surface so as to leave an expandable cross-section of the sleeve adjacent the work engaging surface which when expanded will engage a workpiece.

Other details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF THE ILLUSTRATIVE EMBODIMENT

Figure 1:
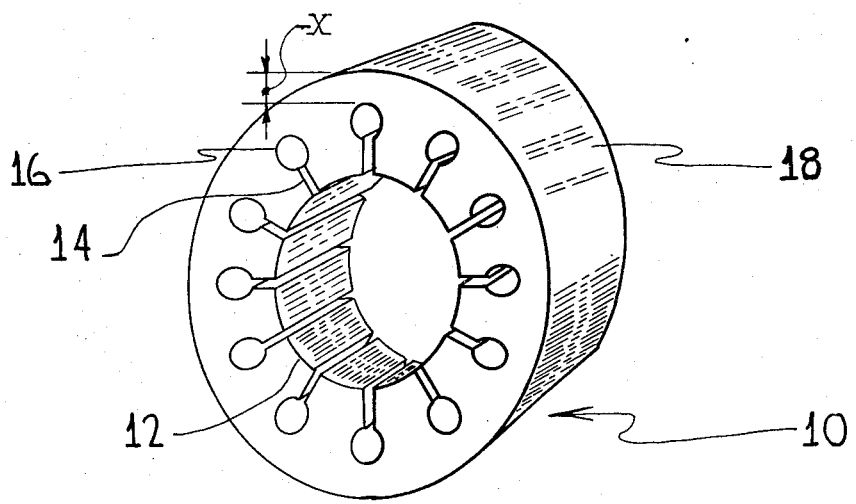
FIG. 1 is a perspective view illustrating the transfer sleeve of this invention in which the work engaging surface is the outer periphery of the sleeve.

Reference is now made to FIG. 1 of the drawings in which the transfer sleeve of this invention is designated generally by the reference numeral 10. The transfer sleeve 10 is a cylindrical sleeve having an annular inner bore 12 extending therethrough. A plurality of radial slots 14 extend radially outward from the bore 12 and terminate in terminal holes or apertures 16, each of which runs laterally through the sleeve. Each slot 14 and aperture 16 extends longitudinally the entire length of the sleeve 10. The outer peripheral surface 18 is the work engaging surface and is used to frictionally engage a workpiece.

The transfer sleeve of FIG. 1 is of the type which is fitted over a typical arbor. The arbor need not be explained here, suffice it to say that when the arbor is actuated, an expansion of the transfer sleeve 10 will occur so that the work engaging surface 18 will be urged outward or expanded into frictional contact with a complementary formed bore in the workpiece. The unique construction of sleeve 10 is such that there will be a continuous and uninterrupted surface engagement between the surface 18 and the workpiece.

It has been found that the distance X is critical to insure that a continuous and uninterrupted engaging surface 18 is provided after expansion of the transfer sleeve 10. The distance X is seen to be the distance between the aperture 16 and the peripheral surface 18 of the sleeve 10. If the distance X is too great, the sleeve will be unable to expand and if the distance X is too small, a series of high and low spots will occur in the outer surface 18 after expansion of the sleeve 10.

The distance X may be calculated for any transfer sleeve when the outside diameter of the sleeve is known. The distance X has been found to be the sum of 0.060 inch for the first inch of diameter plus 0.030 inch for each additional inch diameter. This may be set up in equation form as follows:

$$X = .060 + .030(D-1)$$

where $X$ = the distance between aperture 16 and the work engaging surface 18
$D$ = the outside diameter of the sleeve in inches Hence, if the overall diameter of a transfer sleeve is 1 inch, the distance X would equal 0.060 inch or if the diameter of the sleeve is 10 inches, the distance X would equal 0.060 plus 0.270 or 0.330 inch.

With the above equation, it is possible to precisely determine the correct cross-sectional area of material, i.e., the X distance, which will permit a proper expansion. However, it is difficult to place the apertures 16 so as to provide the correct X distance. Hence, it has been found that an X distance with a plus or minus 10 percent is acceptable and will provide the proper expandable material to insure that a continuous and uniform work engaging surface results therefrom.

Figure 2:
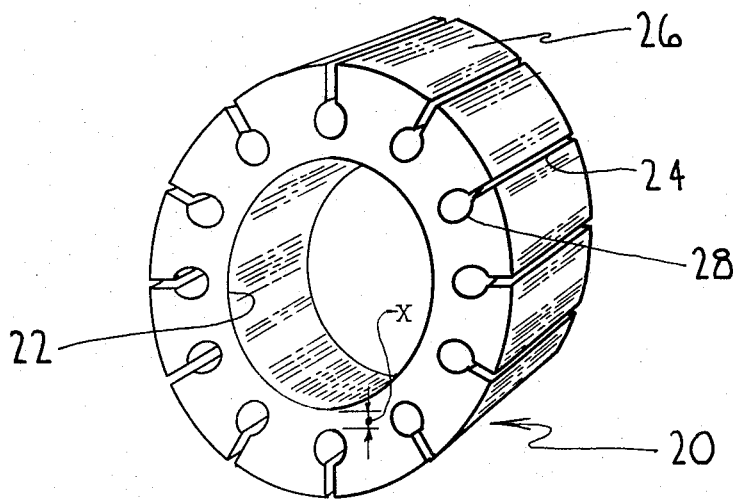
FIG. 2 is a perspective view illustrating the transfer sleeve of this invention in which the inner annular surface of the sleeve forms the work engaging surface.

Referring now to FIG. 2, a transfer sleeve generally designated as 20 is shown for use with a chuck. In this embodiment, the work engaging surface 22 is the annular inner bore of the sleeve 20. The radial slots 24 extend inwardly from the outer periferal surface 26 and terminate in apertures 28 which extend laterally through the sleeve 20. In this embodiment, the distance X may also be calculated as previously described.

The embodiment of FIG. 2 is used when it is desired to engage or grasp the outside diameter of a part or workpiece. The sleeve 20 is inserted in a chuck and the workpiece is inserted through the annular bore of the sleeve. The chuck is actuated and in a known manner the sleeve 20 is expanded inwardly and collapses about the outside diameter of the part so that the work engaging surface 22 is in frictional contact with the part. It is seen that the unique construction of the sleeve 20 is such that there will be a continuous and uninterrupted surface engagement between the surface 22 and the workpiece.

Although the radial slots 14 and 24 are seen to terminate in apertures, other means of terminating the slots may be used. As an example, the slot itself could extend up to the X distance and merely terminate as a slot. However, this would leave a square termination point and will more easily fracture. The use of the laterally extending apertures is optimum in that the stress is evenly distributed about the aperture.

It has been determined that the optimum number of slots in the sleeve depends largely on the size of the sleeve. Ideally, there should be no less than 12 slots and no more than 48 slots. However, if the diameter of the sleeve is extremely small, the number of slots can be reduced to 6 and also for extremely large diameter sleeves, the number of slots may be raised to 60.

It can be seen that the transfer sleeves of this invention are caused to expand, either outwardly or inwardly, by the application of a separate or external force, such as from an arbor or a chuck, to the non-workpiece engaging surface. The sleeve expanding force is a radially directed force, i.e., either radially outward or radially inward. Hence, in the one embodiment, the expansion force is applied to the bore 12 in the radially outward direction and in the other embodiment the external expanding force is applied to the outside peripheral surface 26 and is directed radially inward. Thus, expansion of the respective embodiments provides a sleeve having a workpiece engaging surface with an uninterrupted, solid uniform surface to frictionally engage the workpiece. Because of the annular configuration of the transfer sleeves 10 and 20, the workpiece engaging surface is also seen to be a uniformly round surface. Thus, this invention provides a split transfer sleeve which is of simple and economical construction, is easy to operate, and produces the desired uninterrupted and continuous workpiece engaging surface.

While present exemplary embodiments of this invention have been illustrated and described, it will be recognized that this invention may be otherwise variously embodied and practiced by those skilled in the art.

What is claimed is:

1. A cylindrical transfer sleeve having a bore therethrough responsive to a radially directed force comprising a first annular work engaging surface, a second annular force receiving surface, and a plurality of slots radially extending from said second surface toward said first surface, said slots terminating a predetermined distance from said first surface to leave an expandable cross section of material adjacent said first surface, a plurality of apertures laterally extending the length of the transfer sleeve, each of said slots terminating in one of said apertures wherein each aperture defines one limit of the expandable cross section of material, said expandable cross section being the distance between said aperture and said first surface, and defined as the sum of 0.060 inch plus 0.030 ($D-1$) wherein $D$ is the outside diameter of the sleeve in inches.

* * * * *